United States Patent [19]

Parker

[11] Patent Number: 4,620,462
[45] Date of Patent: Nov. 4, 1986

[54] TOOL FOR REMOVING TRUCK LUG NUTS

[75] Inventor: Paul Parker, Long Beach, Calif.

[73] Assignee: Gene Mayes, Compton, Calif. ; a part interest

[21] Appl. No.: 757,245

[22] Filed: Jul. 22, 1985

[51] Int. Cl.[4] ............................................. B25B 23/00
[52] U.S. Cl. ...................................... 81/462; 81/177.5
[58] Field of Search ...................... 81/52, 177.2, 177.5, 81/177.25, 180.1, 462

[56] References Cited

U.S. PATENT DOCUMENTS

| | | | |
|---|---|---|---|
| 3,069,945 | 12/1962 | Shandel | 81/462 |
| 3,097,550 | 7/1963 | Johnston | 87/462 |
| 3,832,917 | 9/1974 | Feith | 81/462 |
| 4,300,412 | 11/1981 | Houser et al. | 81/462 |

FOREIGN PATENT DOCUMENTS 8300456 2/1983 Sweden ................................ 81/462

Primary Examiner—Frederick R. Schmidt
Assistant Examiner—Bradley I. Vaught
Attorney, Agent, or Firm—Fulwider, Patton, Rieber, Lee & Utecht

[57] ABSTRACT

A lug nut removing apparatus including a torque shaft mounting at one end a lug nut socket and formed on its opposite end for selective receipt in selected ones of a plurality of vertically spaced apart bores formed in an upright stand such that the shaft bridges between the stand and the lug nut. A hub is mounted fixedly intermediate the ends of the shaft and is formed with a plurality of radially outwardly opening socket tubes spaced equal distance thereabout for removable receipt of one end of a lever arm employed to rotate to torque shaft.

4 Claims, 3 Drawing Figures

TOOL FOR REMOVING TRUCK LUG NUTS

BACKGROUND OF THE INVENTION

1. Field of the Invention

The present invention relates to devices for applying high magnitudes of torque to lug nuts of the type that may be employed to secure wheels to the hubs of large trucks or heavy equipment.

2. Description of the Prior Art

It has long been recognized that lug nuts employed to mount large wheels on trucks and heavy equipment require application of high torque often exceeding that which may be applied by conventional wheel wrenches or prior art manual torque devices. Often times a truck driver or heavy equipment operator will be faced with the task of removing a wheel from a vehicle or track from a tracked vehicle without the ready availability of exotic torque applying devices. Frequently, the operator is faced alone with this task without readily available assistance. Since prior art devices have typically proven inadequate to enable a sole workman to apply sufficient force to remove the mounting lug nuts, valuable time is lost in making the necessary tire change and schedules typically disrupted, not only for the directly involved operator and vehicle, but for other equipment and personnel dedicated to a common project. Experience has proven that substantial time, money and convenience could be realized if an economical and reliable lug apparatus were available which would afford sufficient torque for loosening of even the most secure lug nut. Trucks and heavy equipment, being exposed to heavy loads and frequently rugged terrain, require that the lug nuts be tightened to a high torque. This, coupled with the fact that during use the nuts may be exposed to corrosive environmental conditions and sometimes damage, leads to the fact that high torque is frequently required for removal often on the order of thousand foot pounds.

In recognition of the serious problem confronting operators faced with the task of removing such lug nuts, numerous efforts have been made to provide a device which is economical to manufacture and which will supply sufficient mechanical advantage to develop the required torque under typical field conditions. One such device is shown in U.S. Pat. No. 3,158,050 to Shandel. That patent depicts a manual impact wrench having a torque shaft including a socket on one end and having the medial portion thereof telescoped horizontally through a fitting supported from an upright jack stand. Mounted on the remote end of such torque shaft is a cross bar incorporating a pair of diametrically opposed stubs. A double ended impact hammer bar is rotatably received over the end of the shaft to be received between such stubs for rotation relative to the shaft to impact the stubs and apply impact to the torque shaft. Such a device, while adequate for use with passenger car vehicles and the like, has restricted application since the double ended impact bar is of limited length thus limiting the amount of torque which may be applied to the torque shaft. Furthermore, the innerengagement between the impact bar and cross bar is not a positive engagement, thus leaving open the possibility of disengagement under use resulting in injury to the operator and probable damage to the tool itself.

Other efforts have led to lug nut removing devices incorporating a vertical stand having telescoped thereonto a fitting which may be adjusted to selected heights and incorporating a horizontally projecting head receivable in a socket formed on one end of a torque shaft, the opposite end of such torque shaft carrying a lug nut socket. Mounted medially on the torque shaft is a ratchet wheel driven by a lever arm. A device of this type is shown in U.S. Pat. No. 3,095,945 to Shandel. Such an arrangement, while adequate for use in removing lug nuts which have not been excessively tightened, is limited by the fact that under use the stand is loaded on one side and that the coupling with the torque shaft is such that there exists a great danger that the shaft will become uncoupled during use thus resulting in injury to the operator and damage to the device itself and also disfigurement of the lug nut as disengagement under force takes place. Additionally, the use of presently known economical ratchet mechanisms severely limits the magnitude of torque which may be applied.

Other efforts to solve this problem have led to the proposal of torque shafts for bridging between a lug nut and an upright stand, wherein the coupling between the stand and upright is made by a joint and socket connection. A device of this is shown in U.S. Pat. No. 3,097,550 to Johnston. Again, Johnston's arrangement, while being satisfactory for some low torque applications, is limited by the fact that the load is carried on one side of the stand and the lever arm handle can only be engaged with the torque shaft from only two diametrically opposite positions relative to the torque shaft.

SUMMARY OF THE INVENTION

The present invention is characterized by an upright stand formed with a plurality of vertically spaced apart openings which removably receive one end of a torque shaft, the opposite end of such shaft mounting a socket member engageable with a lug nut. Mounted medially on the torque shaft is a hub formed with a plurality of radially outwardly opening socket tubes for telescopical receipt of one end of a lever arm utilized to rotate the shaft.

Other objects and features of the invention will become apparent from consideration of the following description taken in connection with the accompanying drawing.

DESCRIPTION OF THE PREFERRED EMBODIMENT

Figure 1:
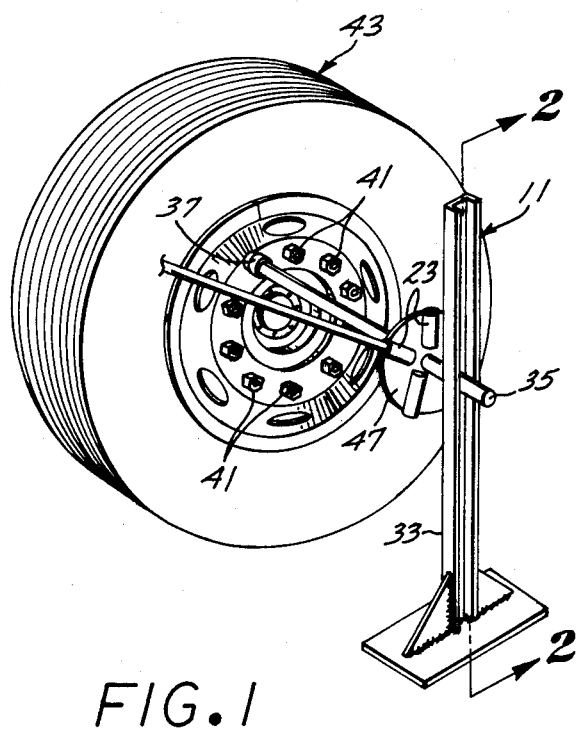
FIG. 1 is a perspective view of a jack stand apparatus incorporating the present invention.

The lug nut removing apparatus of the present invention includes, generally, a stand 11 formed with a plurality of vertically spaced apart horizontal bores 13 for selective telescopical receipt of one end of a torque shaft 15. Mounted centrally on the torque shaft is a hub, generally designated 21, including a plurality of radial socket tubes 23 which removably receive one end of a lever arm, generally designated 25.

Figure 2:
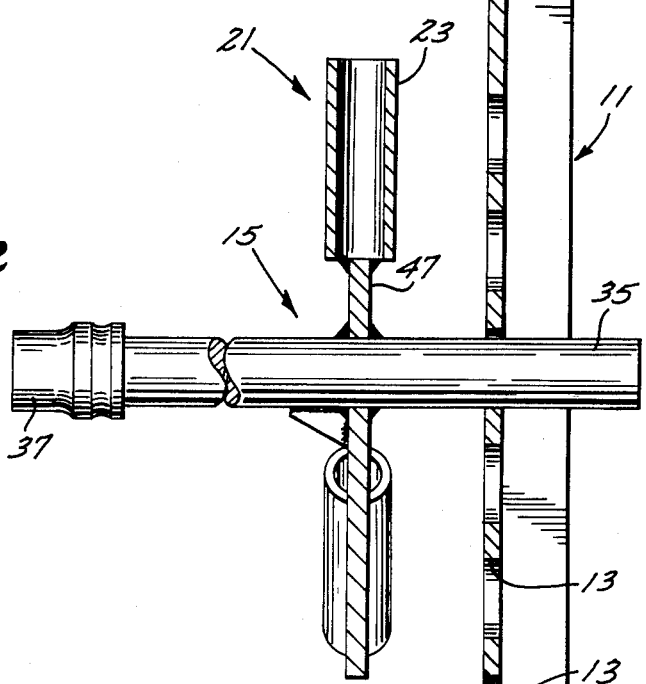
FIG. 2 is a broken vertical sectional view, in enlarged scale, taken along the line 2—2 of FIG. 1.

Referring to FIGS. 1 and 2, the jack stand 11 includes a horizontal base 31 on which mounts an upstanding channel forming a post 33. The bores 13 are spaced vertically apart in the medial web of the channel 33.

With continued reference to FIG. 2, the torque shaft 15 is of solid construction and is formed on one end with a bearing rod 35 telescopically received in a selected one of the bores 13. Mounted on the opposite end of the torque shaft 15 is a socket member 37 formed with a socket recess for engagement with selected ones of lug nuts 41 utilized to hold the wheel, generally designed 43, on a hub (not shown).

The hub 21 includes a circular web 47 having an 8½ inch diameter and formed centrally with a bore through which the torque shaft 15 extends and is welded to such torque shaft. The web 47 is formed with radially projecting slots arranged in spoke fashion for receipt of the socket tubes 23. The socket tubes 23 are then welded in position in such slots to form an array of tubes spaced equal distance about the web 47 such that convenient access may be had for insertion of one end of the lever arm 25 in at least one of such tubes irrespective of the rotative orientation of such hub. The socket tubes have a one inch inside diameter and are 2½ inches long.

Figure 3:
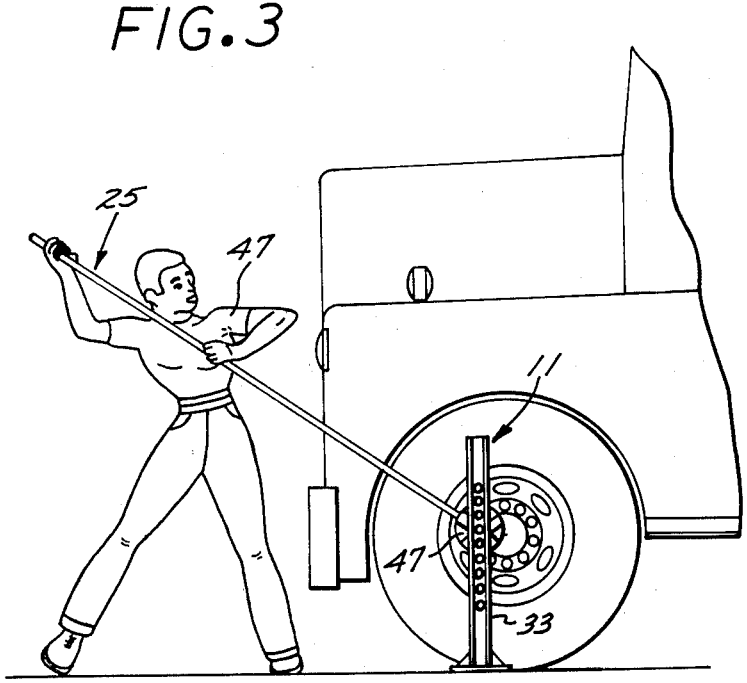
FIG. 3 is a front view, in reduced scale, showing the jack stand apparatus of FIG. 1 in use.

The lever arm 25 is formed on one end for receipt in the passages formed by the socket tubes 21 and is formed on its opposite end with a handle for grasping by the operator 47 as depicted in FIG. 3. The stand 11 is typically on the order of three to four feet in height and the shaft 15 approximately one inch in diameter. The tubes 23 are formed with one inch interior diameters and the lever arm 25 formed with a diameter for free telescoping into the two different ones of the tubes 23. The lever arm 25 is typically on the order of ten feet in length to thus enable an operator 47 having a weight of 150 pounds to apply 1,500 foot pounds of torque to the lug nuts 41.

In operation, the torque shaft 15, stand 11 and lever arm 25 may conveniently be stored in a truck or at the site where heavy equipment is being used. In the event of a breakdown requiring removal of a wheel 43, the stand may easily be erected adjacent the wheel as shown in FIG. 3 and the torque 15 inserted in a bore 13 disposed at an elevation corresponding with that of a lug nut 41 to be removed. The lug nut socket 37 at the opposite end of the shaft 15 may then be engaged with the lug nut to thus bridge the shaft 15 between the post 11 and such lug nut. The operator may then insert one end of the lever arm 25 into one of the tubes 23 and may then apply his weight to the free end thereof to thus apply the necessary torque to such lug nut. In practice, it has been found that the device of the present invention is effective to enable a single operator to remove even the tightest lug nut. In fact, the device of the present invention may be utilized to tighten the lug nuts upon remounting of the wheel to the point where such lug nuts cannot be removed by conventional pneumatic impact wrenches.

From the foregoing it will be appreciated that applicant has provided a rugged effective lug nut removing apparatus which is economical to manufacture and will provide long years of service free use.

Various modifications and changes may be made with regard to the foregoing detailed description without departing from the spirit of the invention.

I claim:

1. A lug wrench apparatus for turning lug nuts holding a wheel to a hub comprising:
   a stand including a base and an upright post, said post being formed with a plurality of vertically spaced apart, horizontal, through openings;
   an elongated torque shaft formed on one end with a bearing rod for rotatable receipt in selected ones of said openings and including on its second end a socket member formed with a socket cavity for receipt non-rotatably over said lug nuts;
   a torque hub affixed to said torque shaft intermediate said bearing rod and said socket member and including a plurality of radial socket tubes disposed equidistant around said hub in spoke fashion and formed with radially outwardly opening passages;
   an elongated rigid lever arm formed on one end for removable receipt in said passage and on its opposite end with a lever arm whereby said stand may be positioned in confronting relationship with related ones of said lug nuts, said bearing rod inserted through a selected one of said openings, said socket member fitted over said selected lug nut and said one end of said lever arm fitted in one of said passages such that an operator can apply his weight to said lever handle to directly apply the resultant rotative force to said hub to rotate said torque shaft and said selected lug nut.

2. A lug wrench apparatus according to claim 1 wherein:
   said socket tubes are formed with passages having a diameter of substantially one inch and said lever arm is of a diameter to be loosely fit in said passages.

3. A lug wrench apparatus according to claim 1 wherein:
   said hub includes a radial web formed with a plurality of radially extending slots open at their radially outer ends for receipt of said respective socket tubes; and
   said socket tubes are affixed in said slots.

4. A lug wrench apparatus according to claim 2 wherein:
   said hub includes a radial web formed with a plurality of radially extending slots open at their radially outer ends for receipt of said socket tubes; and
   said socket tubes are affixed in said slots.

* * * * *